United States Patent
Peng (10) Patent No.: US 12,181,304 B2
(45) Date of Patent: Dec. 31, 2024

(54) METHOD AND DEVICE FOR BUILDING ROAD MODEL

(71) Applicant: NIO TECHNOLOGY (ANHUI) CO., LTD, Hefei (CN)

(72) Inventor: Siwei Peng, Hefei (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 115 days.

(21) Appl. No.: 17/582,162

(22) Filed: Jan. 24, 2022

(65) Prior Publication Data
US 2022/0236074 A1 Jul. 28, 2022

(30) Foreign Application Priority Data
Jan. 25, 2021 (CN) .......................... 202110094424.9

(51) Int. Cl.
*G01C 21/00* (2006.01)
*G01C 21/30* (2006.01)
*G06V 10/74* (2022.01)
*G06V 20/56* (2022.01)

(52) U.S. Cl.
CPC .......... *G01C 21/3815* (2020.08); *G01C 21/30* (2013.01); *G01C 21/3841* (2020.08); *G06V 10/74* (2022.01); *G06V 20/588* (2022.01)

(58) Field of Classification Search
CPC ............... G01C 21/3815; G01C 21/30; G01C 21/3841; G01C 21/3804; G06V 10/74; G06V 20/588; G06F 18/22
See application file for complete search history.

(56) References Cited

U.S. PATENT DOCUMENTS

| | | | | |
|---|---|---|---|---|
| 2020/0218907 A1* | 7/2020 | Baik | ...................... | G06F 17/16 |
| 2020/0408536 A1* | 12/2020 | Fasola | ................... | G01S 7/4808 |
| 2021/0164797 A1* | 6/2021 | Sun | .................... | G01C 21/3602 |
| 2021/0312194 A1* | 10/2021 | Yang | ................... | G05D 1/0094 |
| 2021/0334552 A1* | 10/2021 | Li | ...................... | G01C 21/3602 |

FOREIGN PATENT DOCUMENTS

| | | | | |
|---|---|---|---|---|
| CN | 107330376 A | * | 11/2017 | ......... G06K 9/00798 |
| CN | 110645996 A | * | 1/2020 | ............. G01C 21/30 |
| CN | 111126213 | | 5/2020 | |
| CN | 111209770 A | * | 5/2020 | ......... G06K 9/00201 |
| CN | 111324616 A | * | 6/2020 | ............. G06F 16/23 |
| CN | 111539401 | | 8/2020 | |

(Continued)

OTHER PUBLICATIONS

Machine Translation of CN-107330376-A (Year: 2017).*

(Continued)

*Primary Examiner* — Sahar Motazedi
(74) *Attorney, Agent, or Firm* — Sheridan Ross P.C.

(57) ABSTRACT

The invention relates to a method for building a road model. The method includes: building a lane line pool, the lane line pool including one or more historical lane lines; updating the lane line pool based on matching between a current lane line and the one or more historical lane lines in the lane line pool; and performing lane matching on all lane lines in the updated lane line pool, so as to build the road model. The invention further relates to a device for building a road model, a computer storage medium, and a vehicle.

12 Claims, 4 Drawing Sheets

(56) References Cited

FOREIGN PATENT DOCUMENTS

| WO | WO-2018227980 A1 | * | 12/2018 | ............. | G01C 21/32 |
| WO | WO-2021217420 A1 | * | 11/2021 | ............. | G06F 17/11 |
| WO | WO-2022116704 A1 | * | 6/2022 | | |

OTHER PUBLICATIONS

Machine Translation of WO-2018227980-A1 (Year: 2018).*
Machine Translation of CN-110645996-A (Year: 2020).*
Machine Translation of WO-2022116704-A1 (Year: 2022).*
Machine Translation of CN111209770A (Year: 2020).*
Machine Translation of WO-2021217420-A1 (Year: 2021).*
Machine Translation of CN111324616A (Year: 2020).*
Partial Search Report for European Patent Application No. 22151906.9, dated Jun. 22, 2022, 15 pages.
Extended Search Report for European Patent Application No. 22151906.9, dated Sep. 23, 2022, 13 pages.

* cited by examiner

METHOD AND DEVICE FOR BUILDING ROAD MODEL

CROSS-REFERENCE TO RELATED APPLICATION

This application claims the benefit of China Patent Application No. 202110094424.9 filed Jan. 25, 2021, the entire contents of which are incorporated herein by reference in its entirety.

TECHNICAL FIELD

The invention relates to the field of building road models, and more specifically, to a method and a device for building a road model, a computer storage medium, and a vehicle.

BACKGROUND ART

As functions of an advanced driver assistance system (ADAS) gradually become smarter, requirements for an input of external environment information have become increasingly high, but improvement in a capability of lane line detection (for example, based on vision) is not keeping pace. In some driving cycles, there is still temporary missed detection of lane lines (for example, only the left lane line of the current lane and the right lane line of the right lane are detected), and consequently a misjudgment on the real world is made (that is, a road model built has a deviation), which cannot satisfy more functional design requirements.

SUMMARY OF THE INVENTION

According to one aspect of the invention, there is provided a method for building a road model, including: building a lane line pool, the lane line pool including one or more historical lane lines; updating the lane line pool based on matching between a current lane line and the one or more historical lane lines in the lane line pool; and performing lane matching on all lane lines in the updated lane line pool, so as to build the road model.

As a supplement or an alternative to the above solution, in the above method, the current lane line is detected based on a vision sensor.

As a supplement or an alternative to the above solution, in the above method, updating the lane line pool based on matching between a current lane line and the one or more historical lane lines in the lane line pool includes: calculating a matching score of the current lane line and a historical lane line; and when the matching score is higher than a first threshold, determining that the current lane line matches the historical lane line.

As a supplement or an alternative to the above solution, in the above method, updating the lane line pool based on matching between a current lane line and the one or more historical lane lines in the lane line pool includes: calculating a matching score of the current lane line and a historical lane line; and determining that the current lane line matches a historical lane line corresponding to the highest matching score.

As a supplement or an alternative to the above solution, in the above method, calculating a matching score of the current lane line and a historical lane line includes: calculating the matching score of the current lane line and the historical lane line based on an average distance between the current lane line and the historical lane line and terminal orientation information of the current lane line and the historical lane line.

As a supplement or an alternative to the above solution, in the above method, updating the lane line pool based on matching between a current lane line and the one or more historical lane lines in the lane line pool includes: when the current lane line matches one of the one or more historical lane lines, updating lane line information corresponding to the current lane line in the lane line pool.

As a supplement or an alternative to the above solution, in the above method, updating the lane line pool based on matching between a current lane line and the one or more historical lane lines in the lane line pool further includes: when the current lane line matches none of the one or more historical lane lines, adding the current lane line to the lane line pool.

As a supplement or an alternative to the above solution, in the above method, updating the lane line pool based on matching between a current lane line and the one or more historical lane lines in the lane line pool includes: pre-estimating the one or more historical lane lines based on motion information of a host vehicle; and for a historical lane line in the lane line pool for which matching has not been completed, retaining a pre-estimated state of the historical lane line and lowering a corresponding confidence level of the historical lane line.

As a supplement or an alternative to the above solution, in the above method, when the confidence level is higher than a second threshold, the historical lane line for which matching has not been completed is retained in the lane line pool.

As a supplement or an alternative to the above solution, in the above method, performing lane matching on all lane lines in the updated lane line pool, so as to build the road model includes: building a lane pool, the lane pool including one or more historical lanes generated based on the one or more historical lane lines; and generating a new lane by using the lane line in the updated lane line pool, or associating the lane line in the updated lane line pool with the one or more historical lanes, so as to form a road topology.

As a supplement or an alternative to the above solution, in the above method, generating a new lane by using the lane line in the updated lane line pool, or associating the lane line in the updated lane line pool with the one or more historical lanes includes: when a first lane line in the updated lane line pool matches a first historical lane, updating lane line information corresponding to the first historical lane; and when a second lane line in the updated lane line pool matches none of the one or more historical lanes, generating a new lane based on the second lane line, and re-establishing a topological relationship for the left and right lanes of the new lane.

As a supplement or an alternative to the above solution, in the above method, performing lane matching on all lane lines in the updated lane line pool, so as to build the road model further includes: deleting a lane in the lane pool that does not match the lane line in the updated lane line pool.

As a supplement or an alternative to the above solution, in the above method, performing lane matching on all lane lines in the updated lane line pool, so as to build the road model further includes: for a valid lane in the lane pool, checking left and right lane line information of the lane; and when there is missing lane line information, comprehensively calculating an attribute of the missing lane line based on a lane line on the other side and lane line information of an adjacent lane.

According to another aspect of the invention, there is provided a device for building a road model, including: a first building apparatus configured to build a lane line pool, the lane line pool including one or more historical lane lines; an update apparatus configured to update the lane line pool based on matching between a current lane line and the one or more historical lane lines in the lane line pool; and a second building apparatus configured to perform lane matching on all lane lines in the updated lane line pool, so as to build the road model.

As a supplement or an alternative to the above solution, in the above device, the current lane line is detected based on a vision sensor.

As a supplement or an alternative to the above solution, in the above device, the update apparatus includes: a first calculation unit configured to calculate a matching score of the current lane line and a historical lane line; and a first determination unit configured to: when the matching score is higher than a first threshold, determine that the current lane line matches the historical lane line.

As a supplement or an alternative to the above solution, in the above device, the update apparatus includes: a second calculation unit configured to calculate a matching score of the current lane line and a historical lane line; and a second determination unit configured to determine that the current lane line matches a historical lane line corresponding to the highest matching score.

As a supplement or an alternative to the above solution, in the above device, the first calculation unit or the second calculation unit is configured to: calculate the matching score of the current lane line and the historical lane line based on an average distance between the current lane line and the historical lane line and terminal orientation information of the current lane line and the historical lane line.

As a supplement or an alternative to the above solution, in the above device, the update apparatus is configured to: when the current lane line matches one of the one or more historical lane lines, update lane line information corresponding to the current lane line in the lane line pool.

As a supplement or an alternative to the above solution, in the above device, the update apparatus is further configured to: when the current lane line matches none of the one or more historical lane lines, add the current lane line to the lane line pool.

As a supplement or an alternative to the above solution, in the above device, the update apparatus is configured to: pre-estimate the one or more historical lane lines based on motion information of a host vehicle; and for a historical lane line in the lane line pool for which matching has not been completed, retain a pre-estimated state of the historical lane line and lower a corresponding confidence level of the historical lane line.

As a supplement or an alternative to the above solution, in the above device, the update apparatus is configured to: when the confidence level is higher than a second threshold, retain, in the lane line pool, the historical lane line for which matching has not been completed.

As a supplement or an alternative to the above solution, in the above device, the second building apparatus is configured to: build a lane pool, the lane pool including one or more historical lanes generated based on the one or more historical lane lines; and generate a new lane by using the lane line in the updated lane line pool, or associate the lane line in the updated lane line pool with the one or more historical lanes, so as to form a road topology.

As a supplement or an alternative to the above solution, in the above device, generating a new lane by using the lane line in the updated lane line pool, or associating the lane line in the updated lane line pool with the one or more historical lanes includes: when a first lane line in the updated lane line pool matches a first historical lane, updating lane line information corresponding to the first historical lane; and when a second lane line in the updated lane line pool matches none of the one or more historical lanes, generating a new lane based on the second lane line, and re-establishing a topological relationship for the left and right lanes of the new lane.

As a supplement or an alternative to the above solution, in the above device, the second building apparatus is further configured to: delete a lane in the lane pool that does not match the lane line in the updated lane line pool.

As a supplement or an alternative to the above solution, in the above device, the second building apparatus is further configured to: for a valid lane in the lane pool, check left and right lane line information of the lane; and when there is missing lane line information, comprehensively calculate an attribute of the missing lane line based on a lane line on the other side and lane line information of an adjacent lane.

According to still another aspect of the invention, there is provided a computer storage medium, including instructions, where when the instructions are run, the method as described above is performed.

According to yet another aspect of the invention, there is provided a vehicle, including the device as described above.

According to the solution for building a road model in the embodiments of the invention, the lane line pool is built to track and manage detected lane lines, and form and associate lanes. This solution provides a good road model for the following functional algorithm, and solves the technical problem that a misjudgment on the real world is made when a sensor jumps or misses detection of the lane lines.

BRIEF DESCRIPTION OF THE DRAWINGS

The above-mentioned and other objectives and advantages of the invention will be more thorough and clearer from the following detailed description in conjunction with the drawings, where the same or similar elements are represented by the same numerals.

DETAILED DESCRIPTION OF EMBODIMENTS

To make the objectives, technical solutions, and advantages of the invention clearer, specific embodiments of the invention will be described in further detail below with reference to the accompanying drawings. It can be understood that the specific embodiments described herein are used merely to explain the invention, rather than limit the invention.

In addition, it should also be noted that, for ease of description, the accompanying drawings show only parts related to the invention rather than all content of the invention. Before discussing exemplary embodiments in more detail, it should be noted that some exemplary embodiments are described as processes or methods that are depicted as flowcharts. Although the flowcharts describe various operations (or steps) as sequential processing, many of the operations may be implemented in parallel, concurrently, or simultaneously. In addition, the sequence of the operations may be rearranged. The processing may be terminated when its operations are completed, but it may also have additional steps not included in the accompanying drawings. The processing may correspond to methods, functions, procedures, subroutines, subprograms, and so on.

Although exemplary embodiments are described as using a plurality of units to perform exemplary processes, it should be understood that these exemplary processes may also be performed by one or more modules.

Moreover, control logic of the invention may be included on a computer-readable medium as executable program instructions, which are implemented by a processor or the like. Instances of the computer-readable medium include, but are not limited to, a ROM, a RAM, an optical disc, a magnetic tape, a floppy disk, a flash drive, a smart card, and an optical data storage apparatus. A computer-readable recording medium may also be distributed in a computer system connected to a network, so that the computer-readable medium is stored and implemented in a distributed manner, for example, through a vehicle telematics service or a controller area network (CAN).

Unless specifically mentioned or obvious from context, as used herein, the term "approximately" is understood to be within a range of normal tolerance in the art, for example, within two standard deviations of a mean.

It should be understood that the term "vehicle" or other similar terms used herein includes general motor vehicles, such as passenger vehicles (including sport utility vehicles, buses, trucks, etc.), various commercial vehicles, etc., and includes hybrid vehicles, electric vehicles, etc. A hybrid vehicle is a vehicle with two or more power sources, such as a vehicle powered by a gasoline engine and an electric motor.

In the following, solutions for building a road model according to various exemplary embodiments of the invention are described in detail with reference to the accompanying drawings.

Figure 1:
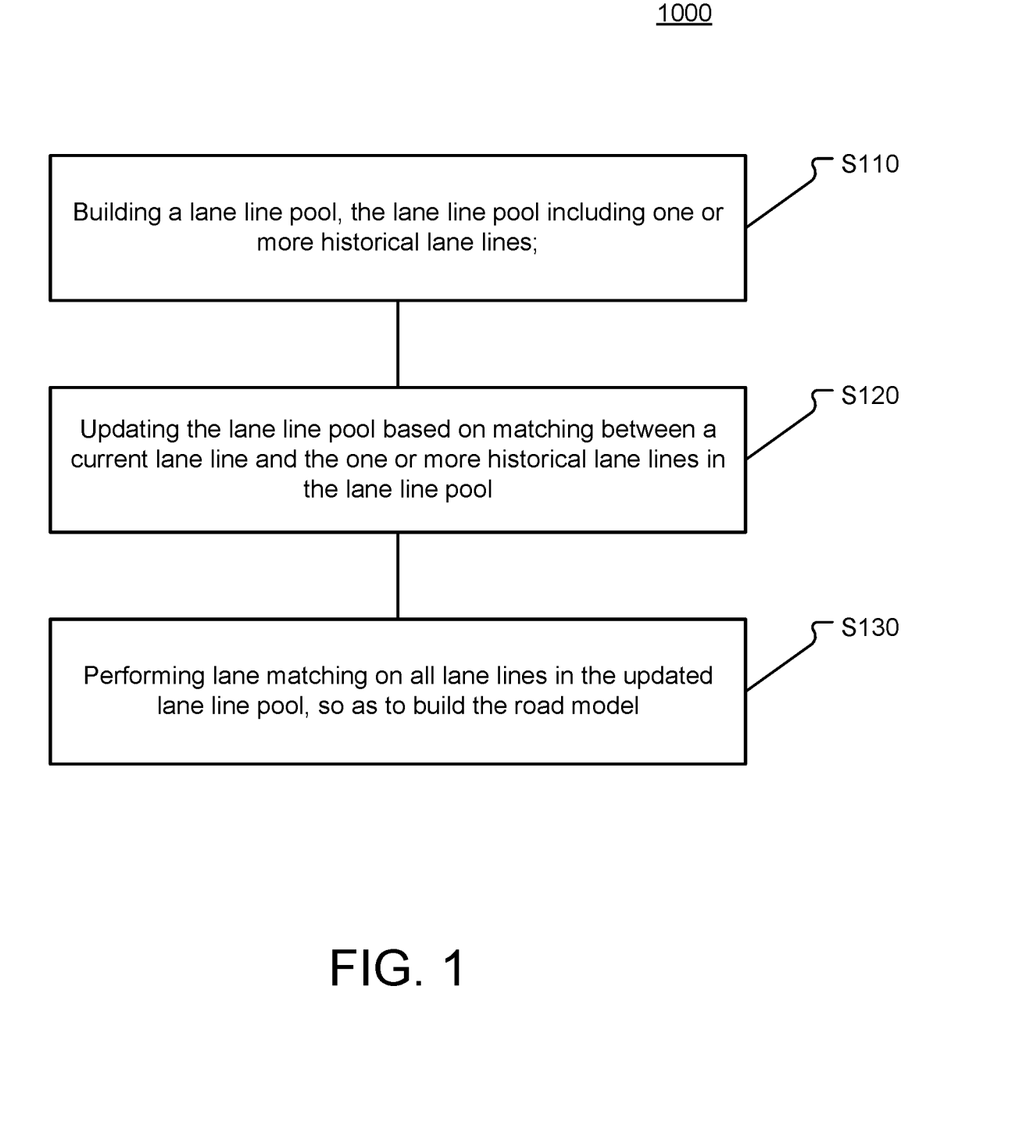
FIG. 1 is a schematic flowchart of a method for building a road model according to an embodiment of the invention.

FIG. 1 is a schematic flowchart of a method 1000 for building a road model according to an embodiment of the invention. As shown in FIG. 1, the method 1000 includes the following steps:

step S110: building a lane line pool, the lane line pool including one or more historical lane lines;

step S120: updating the lane line pool based on matching between a current lane line and the one or more historical lane lines in the lane line pool; and step S130: performing lane matching on all lane lines in the updated lane line pool, so as to build the road model.

In the context of the invention, the term "lane line" may also be referred to as "lane marking", that is, a line that can be used to mark or represent a lane. In one or more embodiments, the lane line may be either a solid line or a dashed line.

The term "current lane line" refers to a current lane line actually detected or calculated, for example, a lane line detected based on a vision sensor. "Historical lane line" is a lane line previously detected or calculated (for example, in a previous cycle) relative to the "current lane line". A set of valid lane lines (information) in historical lane lines is referred to as a "lane line pool".

In the context of the invention, the term "road model" is a model that reflects road environment information and is used for calculations of autonomous driving functions (including but not limited to a lane departure warning function).

It has been impossible to satisfy more requirements for autonomous driving functions by relying solely on information about one or two lane lines. Therefore, in one or more embodiments of the invention, historical information of all lane lines, a road building rule, and information about all detected lane lines are used to build a more complete road model, thereby satisfying increasingly smart functional development requirements.

In one embodiment, step S120 includes: calculating a matching score of the current lane line and a historical lane line; and when the matching score is higher than a first threshold, determining that the current lane line matches the historical lane line. In another embodiment, step S120 includes: calculating a matching score of the current lane line and a historical lane line; and determining that the current lane line matches a historical lane line corresponding to the highest matching score. In one or more embodiments, calculating a matching score of the current lane line and a historical lane line includes: calculating the matching score of the current lane line and the historical lane line based on an average distance between the current lane line and the historical lane line and terminal orientation information of the current lane line and the historical lane line.

In one embodiment, step S120 includes: when the current lane line matches one of the one or more historical lane lines, updating lane line information corresponding to the current lane line in the lane line pool. In one embodiment, step S120 further includes: when the current lane line matches none of the one or more historical lane lines, adding the current lane line to the lane line pool.

In one embodiment, step S120 includes: pre-estimating the one or more historical lane lines based on motion information of a host vehicle; and for a historical lane line in the lane line pool for which matching has not been completed, retaining a pre-estimated state of the historical lane line and lowering a corresponding confidence level of the historical lane line. When the confidence level is higher than a second threshold, the historical lane line for which matching has not been completed is retained in the lane line pool.

Generally, in one embodiment, when lane lines are used to generate the road model, lane line matching and tracking need to be performed first. First, it is necessary to pre-estimate all lane lines in the lane line pool based on the motion information of the host vehicle, and then matching between a detection result of the current lane line and a historical lane line in the lane line pool is performed. Due to the particularity of the lane line, there is no possibility of 1 matching n. Therefore, an average distance between two lane lines and terminal orientation information of the two lane lines can be used to calculate a score for all matches, and a maximum weight matching can be implemented when a matching condition is completed. For a currently detected lane line for which matching has not been completed, the lane line directly goes into the lane line pool. For a historical lane line for which matching has not been completed, a pre-estimated state is retained, and a corresponding confidence level is lowered. If the confidence level is higher than a specified threshold, the historical lane is still retained in the lane line pool.

In one embodiment, step S130 includes: building a lane pool, the lane pool including one or more historical lanes generated based on the one or more historical lane lines; and generating a new lane by using the lane line in the updated lane line pool, or associating the lane line in the updated lane line pool with the one or more historical lanes, so as to form a road topology. Generating a new lane by using the lane line in the updated lane line pool, or associating the lane line in the updated lane line pool with the one or more historical lanes may include: when a first lane line in the updated lane line pool matches a first historical lane, updating lane line information corresponding to the first historical lane; and when a second lane line in the updated lane line pool matches none of the one or more historical lanes, generating a new lane based on the second lane line, and re-establishing a topological relationship for the left and right lanes of the new lane.

In one embodiment, step S130 further includes: deleting a lane in the lane pool that does not match the lane line in the updated lane line pool. In one embodiment, step S130 further includes: for a valid lane in the lane pool, checking left and right lane line information of the lane; and when there is missing lane line information, comprehensively calculating an attribute of the missing lane line based on a lane line on the other side and lane line information of an adjacent lane.

Specifically, in one embodiment, after the lane line matching and tracking are completed, lane matching is then performed on all the lane lines in the lane line pool. If a lane line has matched a lane, the matching relationship is maintained, and a lane line attribute of the lane is updated. If a lane line does not match a lane, according to a road design rule, the lane line necessarily belongs to one or two adjacent lanes. Therefore, it is necessary to generate a new lane based on the lane line, and a topological relationship is re-established for the left and right lanes. After the matching operation is completed for all the lane lines in the lane line pool, an invalid lane in the lane pool starts to be deleted. For a valid lane, left and right lane line information is checked. If it is found that there is lane line information missing in this detection, all missing attributes of the lane line may be comprehensively calculated based on a lane line on the other side and lane line information on the other side of an adjacent lane.

The design division of any lane line on a road is necessarily continuous and belongs to one or two adjacent lanes. Therefore, according to one or more embodiments of the invention, a lane line pool is built, and association and tracking with lane lines in the lane line pool need to be performed in each new detection, so that each lane line can be marked with a unique identifier. Then, based on a priori information mentioned above, a lane line is used to generate a new lane, or is associated with a historical lane, to form a road topology. If a lane line on one side of a lane is missing, the lane line can be predicted, and the undetected lane line can further be added based on other lane line information of the left and right lanes.

Therefore, the foregoing one or more embodiments of the invention can solve the problems such as accidental vision-based missed detection and temporary loss of lane lines that can hardly be solved perfectly by a current vision sensor, and solve the problem that road information given by the sensor is scattered and is not associated with each other.

Figure 2:
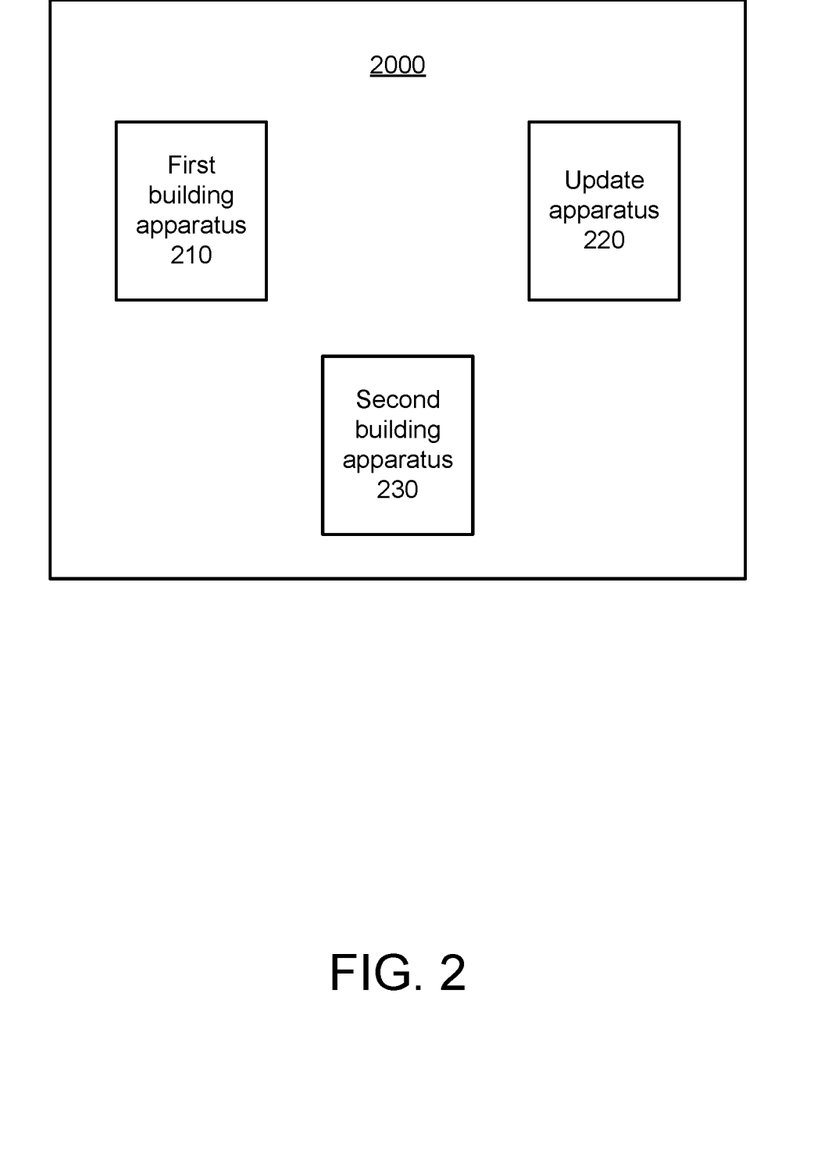
FIG. 2 is a schematic structural diagram of a device for building a road model according to an embodiment of the invention.

FIG. 2 is a schematic structural diagram of a device 2000 for building a road model according to an embodiment of the invention. As shown in FIG. 2, the device 2000 for building a road model includes a first building apparatus 210, an update apparatus 220, and a second building apparatus 230. The first building apparatus 210 is configured to build a lane line pool, the lane line pool including one or more historical lane lines. The update apparatus 220 is configured to update the lane line pool based on matching between a current lane line and the one or more historical lane lines in the lane line pool. The second building apparatus 230 is configured to perform lane matching on all lane lines in the updated lane line pool, so as to build the road model.

In the context of the invention, the term "lane line" may also be referred to as "lane marking", that is, a line that can be used to mark or represent a lane. In one or more embodiments, the lane line may be either a solid line or a dashed line.

The term "current lane line" refers to a current lane line actually detected or calculated, for example, a lane line detected based on a vision sensor. "Historical lane line" is a lane line previously detected or calculated (for example, in a previous cycle) relative to the "current lane line". A set of valid lane lines (information) in historical lane lines is referred to as a "lane line pool".

In the context of the invention, the term "road model" is a model that reflects road environment information and is used for calculations of autonomous driving functions (including but not limited to a lane departure warning function).

In one embodiment, the update apparatus 220 includes: a first calculation unit configured to calculate a matching score of the current lane line and a historical lane line; and a first determination unit configured to: when the matching score is higher than a first threshold, determine that the current lane line matches the historical lane line. In another embodiment, the update apparatus 220 includes: a second calculation unit configured to calculate a matching score of the current lane line and a historical lane line; and a second determination unit configured to determine that the current lane line matches a historical lane line corresponding to the highest matching score.

In one embodiment, the foregoing first calculation unit or second calculation unit is configured to: calculate the matching score of the current lane line and the historical lane line based on an average distance between the current lane line and the historical lane line and terminal orientation information of the current lane line and the historical lane line.

In one embodiment, the update apparatus 220 is configured to: when the current lane line matches one of the one or more historical lane lines, update lane line information corresponding to the current lane line in the lane line pool. In one embodiment, the update apparatus 220 is further configured to: when the current lane line matches none of the one or more historical lane lines, add the current lane line to the lane line pool.

In one embodiment, the update apparatus 220 is configured to: pre-estimate the one or more historical lane lines based on motion information of a host vehicle; and for a historical lane line in the lane line pool for which matching has not been completed, retain a pre-estimated state of the historical lane line and lower a corresponding confidence level of the historical lane line. When the confidence level is higher than a second threshold, the historical lane line for which matching has not been completed is retained in the lane line pool.

In one embodiment, the second building apparatus 230 is configured to: build a lane pool, the lane pool including one or more historical lanes generated based on the one or more historical lane lines; and generate a new lane by using the lane line in the updated lane line pool, or associate the lane line in the updated lane line pool with the one or more historical lanes, so as to form a road topology. In one or more embodiments, generating a new lane by using the lane line in the updated lane line pool, or associating the lane line in the updated lane line pool with the one or more historical lanes includes: when a first lane line in the updated lane line pool matches a first historical lane, updating lane line information corresponding to the first historical lane; and when a second lane line in the updated lane line pool matches none of the one or more historical lanes, generating a new lane based on the second lane line, and re-establishing a topological relationship for the left and right lanes of the new lane.

In one embodiment, the second building apparatus 230 is further configured to: delete a lane in the lane pool that does not match the lane line in the updated lane line pool. In one embodiment, the second building apparatus 230 is further configured to: for a valid lane in the lane pool, check left and right lane line information of the lane; and when there is missing lane line information, comprehensively calculate an attribute of the missing lane line based on a lane line on the other side and lane line information of an adjacent lane.

Those skilled in the art readily understand that the method for building a road model provided in one or more embodiments of the invention can be implemented by using a computer program. For example, when a computer storage medium (such as a USB flash drive) storing the computer program is connected to a computer, the method for building a road model in one or more embodiments of the invention can be performed by running the computer program.

Figure 3:
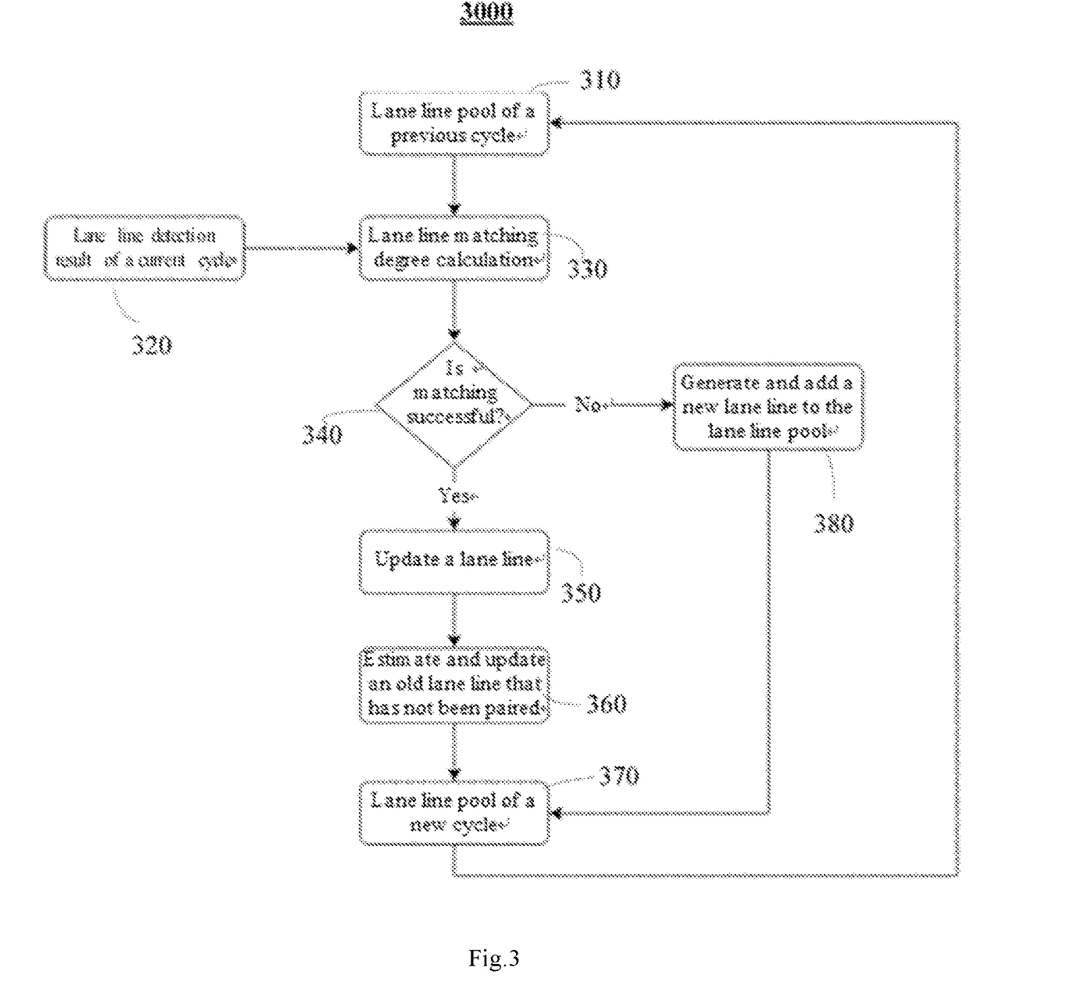
FIG. 3 is a schematic flowchart of lane line matching and tracking according to an embodiment of the invention.

Turning to FIG. 3, FIG. 3 is a schematic flowchart 3000 of lane line matching and tracking according to an embodiment of the invention. As shown in FIG. 3, in step 310, a lane line pool of a previous cycle is obtained; in step 320, a lane line detection result of a current cycle (that is, a cycle at present) is obtained; in step 330, a lane line matching degree is calculated; in step 340, whether matching is successful is determined; if the matching is successful, step 350 is performed to update a lane line, and then in step 360, an old lane line (or historical lane line) that is not paired is estimated and updated; or if the matching is not successful, in step 380, a new lane line is generated and added to the lane line pool; and finally, in step 370, a lane line pool of a new cycle is generated.

Figure 4:
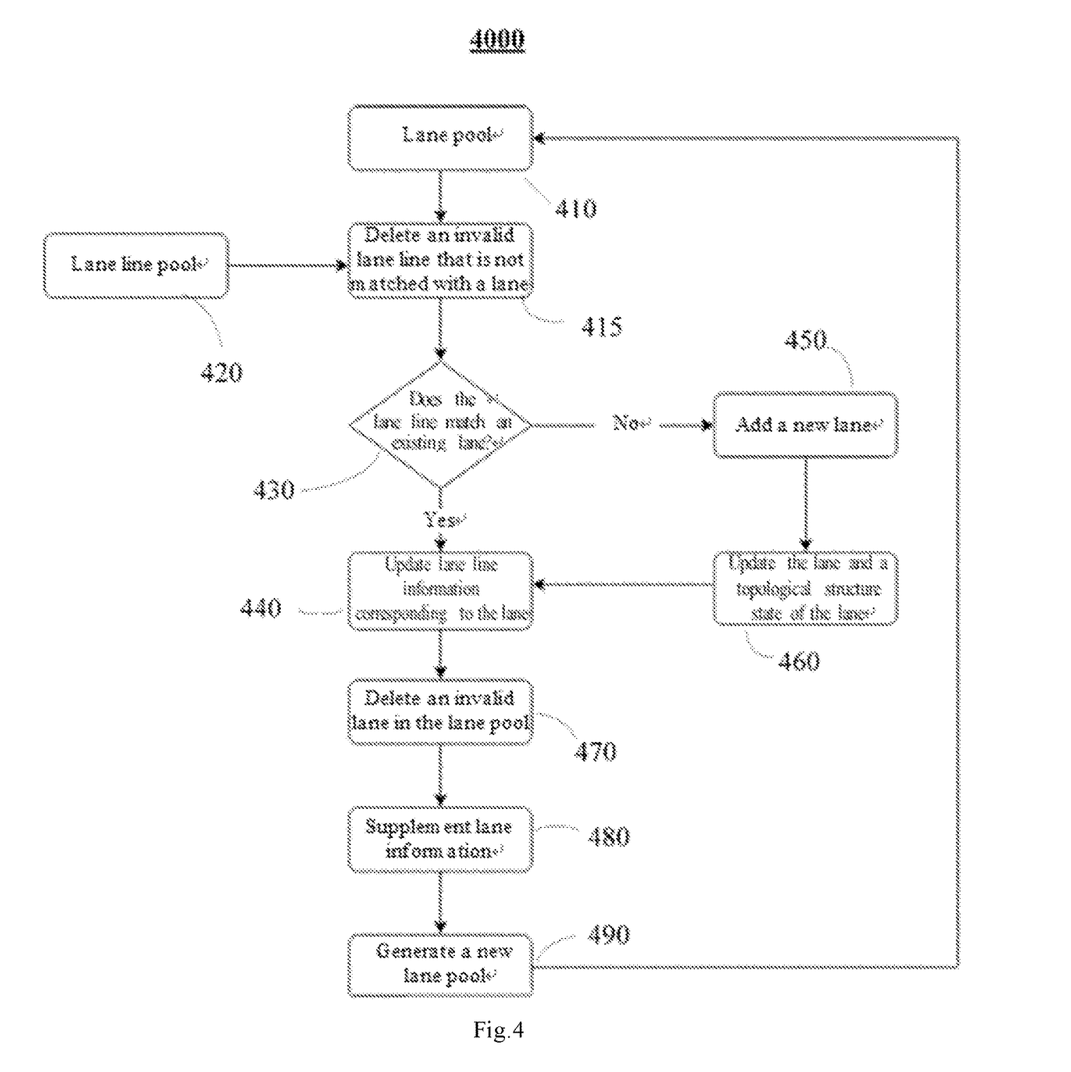
FIG. 4 is a schematic flowchart of building a road model by performing lane matching using lane lines according to an embodiment of the invention.

FIG. 4 is a schematic flowchart 4000 of building a road model by performing lane matching using lane lines according to an embodiment of the invention. As shown in FIG. 4, in step 410, a lane pool is obtained; in step 420, a lane line pool is obtained; and then in step 415, an invalid lane line that is not matched with a lane is deleted. For example, in the process of lane line matching and tracking, if a lane line A is detected in a previous cycle, and the lane line A cannot be matched with any of the latest detections in a current cycle, a confidence level of the lane line A is lowered. If the confidence level continues to be lowered until the confidence level is below a threshold, and no lane is generated based on the lane line, the lane line A needs to be deleted from the lane line pool. If the lane line is matched with a lane, the lane line needs to be deleted, and a lane line matching relationship of the corresponding lane needs to be updated.

In step 430, it is determined whether the lane line matches an existing lane; and if yes, in step 440, lane line information corresponding to the lane is updated; or if no, a lane is added in step 450, and in step 460, the lane and a topological structure state of the lane are updated. In step 470, an invalid lane in the lane pool is deleted, and then in step 480, lane information is supplemented (for example, for missing lane line information, the undetected lane line can be added based on other lane line information of the left and right lanes). Finally, in step 490, a new lane pool is generated.

In conclusion, one or more embodiments of the invention use an association method to track and manage detected lane lines, and form and associate lanes, which can provide a good road model for the following functional algorithm, and can avoid a misjudgment on the real world when a sensor jumps or misses detection of the lane lines.

Although only some embodiments of the invention are described in the specification, it will be appreciated by those skilled in the art that the invention may be embodied in many other forms without departing from the essence and scope thereof. Accordingly, the presented examples and implementations are considered to be illustrative rather than restrictive, and the invention may encompass various modifications and replacements without departing from the spirit and scope of the invention that are defined by the appended claims.

What is claimed is:

1. A method for building a road model, comprising:
   building a lane line pool, the lane line pool comprising one or more historical lane lines;
   generating, by a vision sensor, sensor data;
   identifying a current lane line based on the sensor data;
   updating the lane line pool based on matching between the current lane line and the one or more historical lane lines in the lane line pool;
   performing lane matching on all lane lines in the updated lane line pool, so as to build the road model and avoid a real world misjudgment when the sensor misses detection of lane lines; and
   calculating one or more autonomous driving functions for a vehicle based on the road model, the one or more autonomous driving functions being executed by the vehicle,
   wherein performing lane matching on all lane lines in the updated lane line pool, so as to build the road model comprises:
   building a lane pool, the lane pool comprising one or more historical lanes generated based on the one or more historical lane lines;
   when a first lane line in the updated lane line pool matches a first historical lane of the one or more historical lanes, associating the first lane line with the first historical lane by updating lane line information corresponding to the first historical lane; and
   when a second lane line in the updated lane line pool matches none of the one or more historical lanes, generating a new lane based on the second lane line, and re-establishing a topological relationship for left and right lanes of the new lane.

2. The method of claim 1, wherein updating the lane line pool based on matching between the current lane line and the one or more historical lane lines in the lane line pool comprises:
   calculating a matching score of the current lane line and a historical lane line of the one or more historical lane lines; and
   when the matching score is higher than a first threshold, determining that the current lane line matches the historical lane line.

3. The method of claim 2, wherein calculating the matching score of the current lane line and the historical lane line comprises:

calculating the matching score of the current lane line and the historical lane line based on an average distance between the current lane line and the historical lane line.

4. The method of claim 1, wherein updating the lane line pool based on matching between the current lane line and the one or more historical lane lines in the lane line pool comprises:
   calculating a matching score of the current lane line and a historical lane line of a plurality of historical lane lines included in the one or more historical lane lines; and
   matching the historical lane line and the current lane line when the historical lane line has a highest matching score from among the plurality of historical lane lines.

5. The method of claim 1, wherein updating the lane line pool based on matching between the current lane line and the one or more historical lane lines in the lane line pool comprises:
   when the current lane line matches one of the one or more historical lane lines, updating lane line information corresponding to the current lane line in the lane line pool.

6. The method of claim 5, wherein updating the lane line pool based on matching between the current lane line and the one or more historical lane lines in the lane line pool further comprises:
   when the current lane line matches none of the one or more historical lane lines, adding the current lane line to the lane line pool.

7. The method of claim 5, wherein updating the lane line pool based on matching between the current lane line and the one or more historical lane lines in the lane line pool further comprises:
   estimating the one or more historical lane lines based on motion information; and
   for a historical lane line in the lane line pool for which matching has not been completed, retaining an estimated state of the historical lane line and lowering a corresponding confidence level of the historical lane line.

8. The method of claim 7, wherein when the confidence level is higher than a threshold, the historical lane line for which matching has not been completed is retained in the lane line pool.

9. The method of claim 1, further comprising:
   after performing lane matching on all lane lines in the updated lane line pool, so as to build the road model, deleting an invalid lane in the lane pool that does not match any lane line in the updated lane line pool.

10. The method of claim 9, further comprising:
    after performing lane matching on all lane lines in the updated lane line pool, so as to build the road model, for a valid lane in the lane pool, checking left and right lane line information of the valid lane; and
    when one of the left and right lane line information is missing, calculating an attribute of a missing lane line associated with the missing one of the left and right lane line information based on a lane line associated with the other of the left and right lane line information and lane line information of an adjacent lane.

11. A device for building and using a road model, comprising:
    a memory; and
    a computer processor configured to:
    build a lane line pool, the lane line pool comprising one or more historical lane lines;
    receive sensor data generated based on output of a vision sensor;
    identify a current lane line based on the sensor data;
    update the lane line pool based on matching between the current lane line and the one or more historical lane lines in the lane line pool;
    perform lane matching on all lane lines in the updated lane line pool, so as to build the road model and avoid a real world misjudgment when the sensor misses detection of lane lines; and
    calculate one or more autonomous driving functions for a vehicle based on the road model, the one or more autonomous driving functions being executed by the vehicle,
    wherein performing lane matching on all lane lines in the updated lane line pool, so as to build the road model comprises:
       building a lane pool, the lane pool comprising one or more historical lanes generated based on the one or more historical lane lines; and
       generating a new lane by using a lane line in the updated lane line pool, or associating the lane line in the updated lane line pool with the one or more historical lanes;
    wherein after performing lane matching on all lane lines in the updated lane line pool, so as to build the road model, the computer processor is further configured to:
       delete an invalid lane in the lane pool that does not match any lane line in the updated lane line pool;
       for a valid lane in the lane pool, check left and right lane line information of the valid lane; and
       when one of the left and right lane line information is missing, calculate an attribute of a missing lane line associated with the missing one of the left and right lane line information based on a lane line associated with the other of the left and right lane line information and lane line information of an adjacent lane.

12. A non-transitory computer storage medium, comprising instructions, wherein when the instructions are run, a method for building and using a road model is performed, the method comprising:
    building a lane line pool, the lane line pool comprising one or more historical lane lines;
    receiving sensor data generated based on output of a vision sensor;
    identifying a current lane line based on the sensor data;
    updating the lane line pool based on matching between the current lane line and the one or more historical lane lines in the lane line pool;
    performing lane matching on all lane lines in the updated lane line pool, so as to build the road model and avoid a real world misjudgment when the sensor misses detection of lane lines; and
    calculating one or more autonomous driving functions for a vehicle based on the road model, the one or more autonomous driving functions being executed by the vehicle,
    wherein performing lane matching on all lane lines in the updated lane line pool, so as to build the road model comprises:
       building a lane pool, the lane pool comprising one or more historical lanes generated based on the one or more historical lane lines;
       when a first lane line in the updated lane line pool matches a first historical lane of the one or more historical lanes, associating the first lane line with the first historical lane by updating lane line information corresponding to the first historical lane; and when a second lane line in the updated lane line pool matches none of the one or more historical lanes, generating a new lane based on the second lane line, and re-establishing a topological relationship for left and right lanes of the new lane.

* * * * *